(12) United States Patent
Huides

(10) Patent No.: US 11,843,507 B1
(45) Date of Patent: Dec. 12, 2023

(54) DETERMINING COMPATIBILITY ISSUES IN COMPUTING ENVIRONMENTS

(71) Applicant: Amazon Technologies, Inc., Reno, NV (US)

(72) Inventor: Rodica-Alexandra Rodica Huides, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 18/064,464

(22) Filed: Dec. 12, 2022

(51) Int. Cl.
*H04L 41/0873* (2022.01)
*H04L 43/06* (2022.01)
*H04L 61/251* (2022.01)

(52) U.S. Cl.
CPC .......... *H04L 41/0873* (2013.01); *H04L 43/06* (2013.01); *H04L 61/251* (2013.01)

(58) Field of Classification Search
CPC ........................... H04L 41/0873; H04L 43/06
See application file for complete search history.

*Primary Examiner* — Brian Whipple
(74) *Attorney, Agent, or Firm* — Hogan Lovells US LLP

(57) ABSTRACT

Approaches presented herein relate to the management of compatibility and support issues in a networked resource environment. An analyzer service can be used to attempt to identify potential or existing compatibility and other such issues in the environment, as may occur when updating to a new communication protocol or data standard. Such a service can analyze an environment at multiple levels, such as at an infrastructure, services, operating system, and/or code level. For any identified issue, the service can provide information about the issue, as well as one or more recommendations for remediation where available. For at least certain types of issues where permitted, the service can perform a remediation, such as to remove hard-coded dependencies or perform pending software updates. Compatibility monitoring can also be performed over time to ensure continued compatibility, including for additions or modifications in the environment.

20 Claims, 8 Drawing Sheets

DETERMINING COMPATIBILITY ISSUES IN COMPUTING ENVIRONMENTS

BACKGROUND

In any given computing environment, there will occasionally be upgrades or modifications that need to be performed if that environment is to be compliant with, or support, new resources, protocols, standards, or offerings. For example, in a networked environment that supports communications over a network such as the Internet, components in the environment may occasionally need to support new Internet protocols, such as to move from supporting Internet protocol version 4 (IPv4) to also, or alternatively, supporting IPv6. In order to support such an update, there are often many aspects in the environment that need to be checked at various levels of operation to identify where a change or update may need to be made. Traditionally this has involved a significant number of manual checks and verification, which requires a high amount of expertise of often multiple people, can be very time-consuming, and has potential for human error, which can delay such an upgrade or result in downtime due to not identifying and properly remediating any aspects that do or will not function accurately upon such an upgrade.

BRIEF DESCRIPTION OF THE DRAWINGS

Various embodiments in accordance with the present disclosure will be described with reference to the drawings, in which.

DETAILED DESCRIPTION

Figure 1:
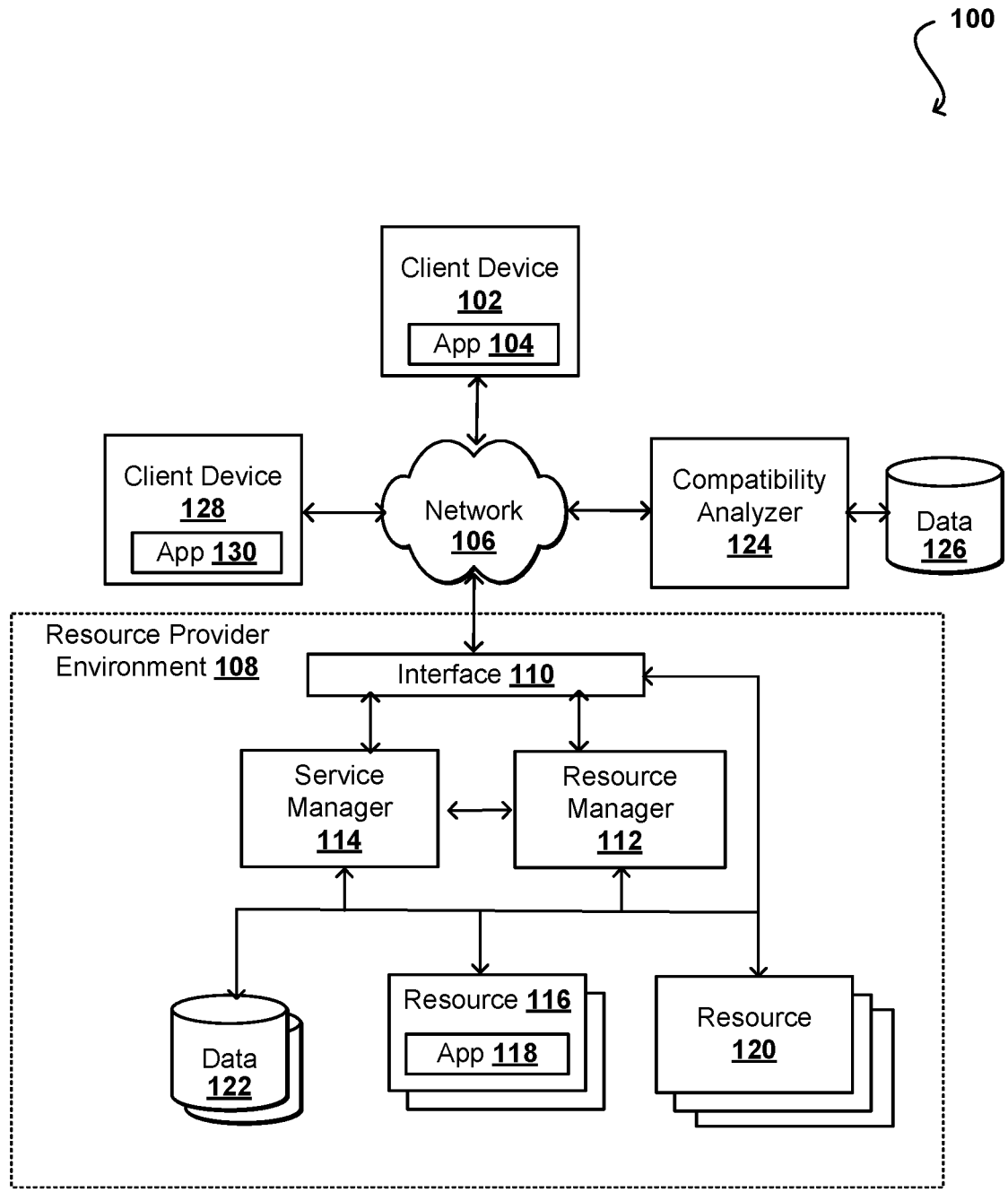
FIG. 1 illustrates example components for identifying compatibility issues at multiple different levels that can be used in accordance with various embodiments.

Approaches described and suggested herein relate to the management of resources in an environment, such as a distributed or networked computing environment. In particular, various embodiments provide for the identification and remediation of compatibility, support, or other such issues that may impact functionality or interoperability of various resources. In a given computing environment, there may be many networked resources that may be updated or modified over time. This may include different selections of resources or approaches for connecting those resources, as well as hardware and software updates to the resources themselves, among other such modifications. Often when there is such a change in the environment, there is at least some risk that there will be an incompatibility or other such issue as a result. For example, a new resource may be added that does not provide communications in a required format for the environment, or it may be desired to update to a new protocol to be used for communications in the environment that may not be supported by all resources (computing, networking, or otherwise) in the environment. In some instances, there may be existing dependencies that may be broken if such an update or modification is performed, which can result in a loss or corruption of data or communications, among other such undesirable consequences.

In order to help identify and mitigate such issues, a system, service, or process such as a compatibility analyzer can be used that may be provided from within, or external to, such an environment. A compatibility analyzer in at least one embodiment is provided as a service to which a user can subscribe, and that can perform compatibility analysis for an identified environment or other logically-grouped network of resources. "Compatibility" will be used as a primary example term herein, but this should be construed broadly to include any support, communication, or other ability of two or more resources to communicate or interact in a designed or intended fashion to accomplish a specific task or action. Such an analyzer service may include multiple analytical tools, or sub-services, that can analyze the environment at multiple layers or levels. For example, an infrastructure tool can perform discovery to identify the relevant resources (e.g., computing resources such as servers, databases, and load balancers) in the environment and their interconnection, and can then determine whether there are any compatibility issues at this infrastructure level, such as may prevent these resources from successfully sending communications between themselves or outside the environment. A services layer tool can be used to determine whether any services called by resources in this environment, as may be identified using call or flow logs, present compatibility issues. An operating system (OS) layer tool can be used to determine whether the current version of an OS running (or planned to be run) on any resource in the environment presents compatibility issues. A code layer tool can be used to determine whether any code executing in the environment presents compatibility issues. There may be many other tools used for different layers, as well as different tools to analyze different issues at the same or similar layers, among other such options. Such a service can be used to determine whether any such issues currently exist, or would likely exist in the event of a specified change, such as an update in communication protocol or data formatting standard. For an identified issue, the service can at least provide some type of notification, along with one or more recommendations for remediation in at least some circumstances. Where permitted, the service may also attempt (directly or indirectly) to perform one or more remediation actions for at least certain types of issues, such as to remove hard-coded dependencies or perform a pending update to an operating system. Such analysis can be performed periodically as part of a monitoring process, or in response to a detected change in a resource, application, connection, or other such aspect or factor.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an example networked environment 100 that can be used to determine potential combability (or other such) issues in a computerized or electronic environment. In this example, a user may utilize a client device 102 to access resources across at least one network 106, such as the Internet, a cellular network, or another wired and/or wireless network. A resource in this context can refer to any electronic component, such as hardware and/or software able to receive, transmit, and/or process data in a networked environment, as may include a server or virtual machine, database, network switch, and the like. The client device 102, or an application 104 executing on the client device, can attempt to communicate with various other devices, systems, services, entities, or other recipients, as may be part of a resource provider environment 108, such as a cloud computing environment, or another client device 128 that may run a similar or related application 130 for which data is to be shared. The client device 102 may also communicate with various resources in a resource provider environment 108, such as an interface (e.g., an application programming interface (API)) of an interface layer 110 or resources 116, 120 of one or more types, which may also in turn execute at least one application 118 for which data or communications are to be shared. The resources can be any type of resources for transmitting and/or processing data, such as may include servers, virtual machines, and data repositories 122, among other such options. At least some of these resources 116, 120 and data repositories may also communicate with each other for various tasks, as may be under the guidance of at least one resource manager 112 or service manager. A resource manager can be tasked with allocating available resources to perform certain tasks, or for use by certain users, etc. A service manager 114 may manage at least some of these tasks on behalf of users, applications, or devices, for example, and may work with the resource manager 112 in order to ensure that adequate resources are available to perform those managed tasks.

In order for any or all of these systems, services, devices, components, applications, and processes to communicate with each other, as well as other such resources or entities, they need to be able to communicate using at least one common language, format, standard, or protocol. While all of these resources or entities do not necessarily have to speak the same language, any two or more resources or entities that intend to communicate with each other need to speak at least one common language. As used herein, a common "language" can refer to any communication/network protocol or format that two or more parties can use to communicate, so that the parties can understand each other. A network protocol can include an agreed-upon set of rules that determine how data or a communication is to be transmitted in a networked environment, independent of the type or configuration of device or resource acting as a party to a communication. An example of such a network protocol is the Internet Protocol (IP). In order to communicate properly, it may not be enough for these various devices or participants to a communication to utilize the same protocol, but may also need to support a specific version of that protocol, such as IP version 4 (IPv4) or version 6 (IPv6).

In certain situations, a user may be able to determine whether a given device or resource supports a specific protocol, format, technology, or standard, etc. For example, a user of client device 102 may be able to check the software and/or hardware installed on that device (e.g., a desktop, notebook, smartphone, tablet, or wearable computer) to determine what is supported by that device. In the case of a user such as a customer of a cloud provider or an enterprise system, however, the user may lack visibility into the configuration and dependencies of various components, devices, systems, or services that are allocated to that user, such as for a set of resources 116, 120 allocated to the user from the resource provider environment 108. Such lack of visibility can be problematic when, for example, the resources need to be updated to support a new protocol or standard. A user might be able to obtain certain information, such as which components support IPv4 for communications, based at least in part upon monitoring those communications. The user may not be able to determine support for communications that are internal to the resource provider environment 108, however, and are never received by the client device 102 associated with the user.

One difficulty that arises from such a lack of visibility is the risk in an error occurring when there is a change or update to one of these protocols or standards, for example, or a resource is added that does not support one of these protocols or standards. As mentioned, a user without sufficient visibility may be unable to determine which resources support the current protocol or standard, and thus need to be updated to the new protocol or standard. Further, the user will often be unable to determine whether support of a specific protocol, or version of that protocol, is hard-coded into those resources or can be easily or automatically updated. For example, if resources in a resource provider environment 108 are to be updated from supporting IPv4 to IPv6, then the user may have little ability to identify which workloads are likely to break (or suffer one or more issues in operation) in various environments, such as dual stack or IPv6-only environments. The inability to identify various support or dependencies can serve as a major detractor for various users to want to update or change to support different protocols, standards, or other technologies, particularly at scale.

Accordingly, approaches in accordance with various embodiments can provide at least some of these and other such insights using a system, service, application, or process, such as a compatibility analyzer 124. A compatibility analyzer 124, which may be internal or external to the resource provider environment 108, can provide various tools that can be used to obtain visibility into various support options and dependencies among resources allocated to that user. In at least one embodiment, a compatibility analyzer service can analyze all resources in a resource provider environment 108, or can analyze just those resources that are currently (or potentially could be) allocated to a given user, or for performing operations related to that user. In order to ensure that the compatibility analyzer 124 identifies all critical locations, an allocated resource environment for a user can be analyzed at multiple different levels. This may include, for example, analyzing at a infrastructure level, a services level, an operating system (OS) level, and/or a code level, among other such options. At the infrastructure level, the analyzer can attempt to determine whether there are various communication links (e.g., Direct Connect links for Amazon Web Services (AWS)) that are enabled for a specific protocol, such as IPv6. At the services level, the analyzer can attempt to determine whether any services (e.g., Web services such as Gateway Load Balancer from AWS) are being used that do not support a specific protocol. At the operating system (OS) level, the analyzer can attempt to identify whether an operating system being run by any resource in that target environment (or "user" environment) can reliably support that protocol. At the code level, the analyzer can attempt to identify whether any calls are being made to legacy code libraries (e.g., OS or C libraries) that only support a different protocol or version (e.g., only IPv4 vs. IPv6), if there are variable definitions that do not support IPv6 values, or if there are hard-coded addresses that do not specify the new or updated protocol or version (e.g., IPv6). Such a multi-level analysis can provide a detailed report on the relevant dependencies in a user-allocated environment, for example, and can outline risks for adoption of a new protocol or standard. In at least one embodiment, a compatibility analyzer 124 can also provide one or more tools for developing, suggesting, and/or implementing a mitigation plan with resources to assist with tasks such as error prevention, compatibility assurance, and/or incompatibility remediation.

A change in protocol from IPv4 to IPv6 is typically not a straightforward change in most environments, as the protocol definition changed to go from 32 bits to 128 bits to accommodate more IP space. Such a change can prevent backward compatibility, as the prior 32 bit standard does not have the ability to support the larger 128 bit standard. There are other changes as well that are not fully supported by only IPv4 compatible devices. Thus, a resource that supports only IPv4 cannot communicate with an IPv6 resource without risk of error. Before upgrading to IPv6, a user with IPv4 (or other) compatibility in their environment may want to at least identify the weak spots or risks in the upgrade, in addition to those resources or components that are highly likely to break if there is an upgrade because they are guaranteed to be unable to communicate using the new protocol.

A compatibility analyzer 124 (or other such system or service) can analyze multiple different aspects of a given environment at multiple levels to attempt to identify any incompatibilities, or risks for incompatibility, in the event of an upgrade, modification, or addition or a protocol or standard to be supported in a given environment. Any networked environment is likely to rely on an ability to access at least some services, endpoints, or resources. If a resource does not support a given protocol, not only will that resource not be able to communicate, but any user who supports that protocol may be unable to access that resource at all. A compatibility analyzer can attempt to identify these issues so they can be addressed in preparation for an upgrade, or can be used to determine not to upgrade to a given protocol or standard, among other such options. In some embodiments, an analyzer may also suggest potential changes or remediations based on these findings, or in some cases may automatically make adjustments to avoid some of these issues. For example, if a protocol is hardcoded into a service, the analyzer (or a component in communication with the analyzer) can modify the code to replace the hard coded selection with code that does not limit the service to use of a specific protocol, and may make any other changes that are deemed to be necessary. In some embodiments, human approval may be required before such a change can be made.

Figure 2:
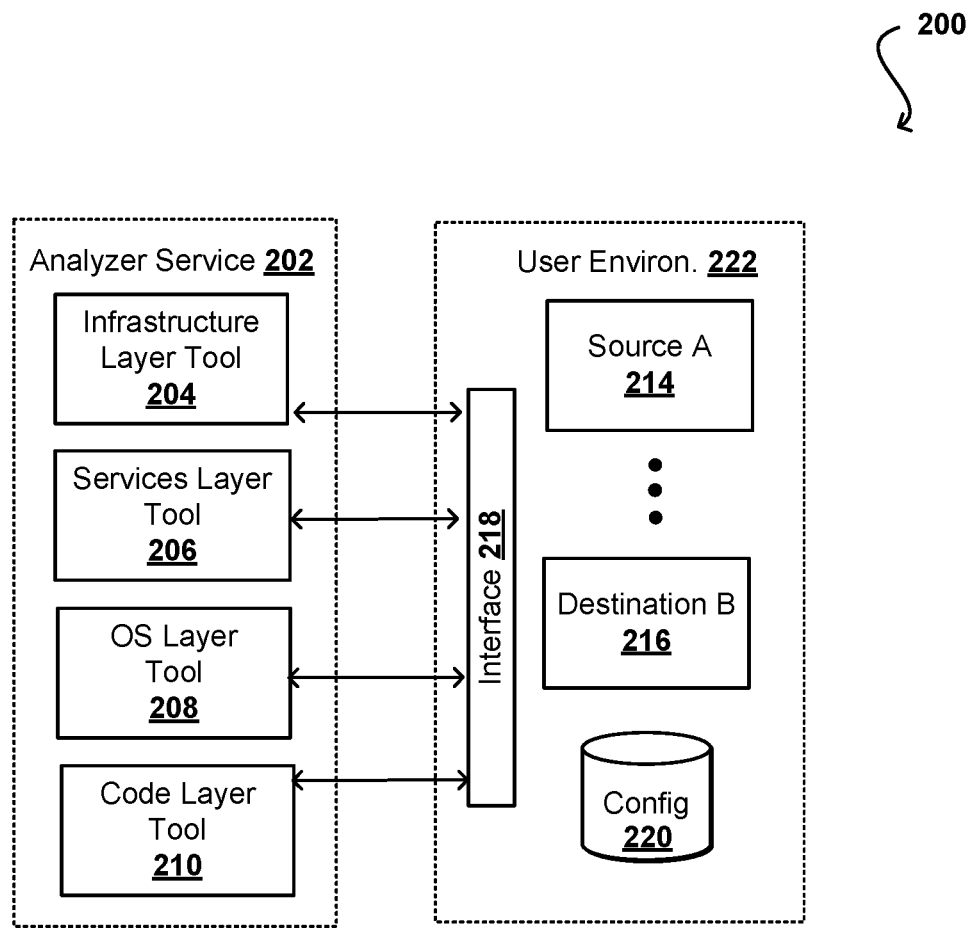
FIG. 2 illustrates use of an analyzer service with tools used at multiple layers of an environment that can be used in accordance with various embodiments.

FIG. 2 illustrates components 200 of an example set of layer or levels of analysis that can be performed in accordance with at least one embodiment. In this example, an analyzer tool 202 can include components or processes that can analyze a networked environment at one or more layers, such as at four different layers as illustrated in FIG. 2. In this example, this includes components for an infrastructure layer 204, a services layer 206, an operating system (OS) layer 208, and a code layer 210, although fewer, additional, or alternative layer analyzer components could be used as well within the scope of various embodiments. As mentioned, analysis at an infrastructure layer can involve determining whether any aspect of the environment related to network connectivity would be impacted by a given change. This can include, for example, determining whether any IPv6 packets from source A in an environment can be properly delivered to destination B, where that environment previously supported only IPv4 (or at least did not fully or knowingly provide support for IPv6). In order to ensure that source A can communicate with destination B, the network infrastructure between A and B has to be IPv6 ready. This includes being able to receive a packet from source A and route that packet in the relevant infrastructure to destination B 216.

In order to determine such readiness, an infrastructure layer component 204 can include (or utilize) a tool that can get access to a user environment through a set of permissions. When a user uses an analyzer tool 202, the user can provide the necessary credentials or permissions for the analyzer to be able to send communications and understand the network topology associated with those communications. In some embodiments, the user may not need to provide credentials, but can instead grant delegated authority or permission to the tool under a user account associated with the environment. The tool can then obtain relevant information, such as which virtual private clouds (VPCs) are allocated to the user, the regions in which the user has resources allocated, where hybrid connectivity is in place, where Internet connectivity is in place, and so forth. The infrastructure layer tool 204 can then use this information to attempt to determine whether the corresponding constructs are enabled for IPv6 operation. This can include determining whether an IPv6 packet can be delivered from any source A (e.g., network component or endpoint) to any destination B in this user environment, or is able to receive any IPv6 packet from inside (or outside) the user environment.

In one example, an infrastructure layer tool 204 can discover portions of a user infrastructure by interacting with various interfaces (e.g., APIs) of that infrastructure. The tool may discover that a user environment includes 20 private cloud subnetworks, forty compute instances, and five extended Kalman filter (EKF) clusters. The tool can use this information, along with various rules in the back end, to determine what would be necessary for these components to support a protocol, such as IPv6. This may include, for example, IPv6-compatible interfaces and IPv6 routes in a route table, among other such options. In at least some embodiments, an analyzer tool 202 may include one or more neural networks to attempt to learn these requirements for various combinations of resources or components. Such a network could be trained on various environments with different components, layouts, and protocol support, and can continue learning as it generates inferences for additional input environment data. The network can then learn requirements for various protocols or standards without having to be specifically trained for each new protocol or standard. Such a network can also be used to optimize an environment, even if that environment is determined to support a new standard or protocol. For example, the infrastructure may support a new protocol, but the layout or configuration of that infrastructure may be optimized in light of this new protocol being used. The network can also learn an internal checklist for things to analyze or verify for a given environment.

In some embodiments, a tool may have a "discovery" mode of operation where the tool attempt to discover any and all resources, services, or processes within a given environment. This may include at least specific types of environment components, such as those that may communicate with other components or utilize credentials. Such a tool can attempt to discover and understand a scope and configuration of an environment before attempting to evaluate that environment for certain compatibility or support. A model or network used for such analysis can therefore be trained to identify and understand new variations of infrastructure, operating systems, services, libraries, and so forth. Such a network can also utilize continued learning, such as where a network learns about a new way to connect a private cloud in an environment. And for each potential failure or incompatibility, the network or model can also update its knowledge base through these learnings as well.

Once analyzed, or during the analysis in some embodiments, an analyzer tool 202 can provide information about the analysis. For example, the tool might provide information about all resources (or at least all resources of specified types) detected for a user environment or deployment. This may include identifying compute instances allocated to the user as part of a private cloud offering. The tool may also provide information about whether those detected resources are compliant with a given standard or protocol, such as whether a routing table includes IPv6 routes or whether this private cloud has IPv6 addresses assigned to it. This infrastructure layer can evaluate communication routes between all components of a given environment to determine readiness for a change in standard or protocol, and can identify places in the environment where there may be (or will certainly be) issues with that change.

A services layer tool 206 can also be used that can attempt to determine whether a customer deployment uses any services (e.g., Web services) that do not support a given protocol or standard, such as IPv6. A determination can be made that Source A 214 can send an IPv6 packet to destination B 216, where destination B may correspond to an API or interface for a service. This may be a service hosted by resources in, or at least partially external to, the resource provider environment such as where the service might be a user-managed service. A customer deployment might utilize hundreds of different services, so it can be important to ensure that none of these services will break or cause issues for an upgrade. In one example, a services layer tool 206 can look at flow logs (or other repositories for message flow and communications) in an environment to determine which services are being called, for example. The services layer tool 206 can then attempt to determine whether each of these services will support an upgrade, such as whether a given service can understand an IPv6 test request sent to that service. The tool can then provide a report, response, summary, or recommendation to the user indicating which services are compliant and which services are not compliant, or in some instances any services for which compliance or compatibility may not be determinable. In some embodiments, a service repository can store information for various services such that when a service is determined to be compliant with a standard or protocol, that compliance does not have to be independently verified again unless there has been, or could have been, some modification to the operation of the service. If it is determined that a given service does not (or may not) support a new standard or protocol, a notification may also be sent to a provider of that service (whether the resource provider, the user, or otherwise) indicating this determination, whereby the service provider can choose to make the service compliant, indicate that the service will not support a given protocol or standard, or provide confirmation that the service does in fact support that protocol or standard, among other such options.

An operating system (OS) layer tool 208 can attempt to determine whether the OS running on any resource in a customer deployment supports a given standard or protocol. The tool can contact all appropriate resources in an environment or allocation to attempt to determine whether the OS that resource is running is compatible or compliant with a new standard or protocol, for example. This can include determining the OS running on each device, such as by checking a configuration database 220 that contains configuration (or related) information for each resource, or by sending a request to each resource for information about its OS. In many instances, a standardized OS (at least for certain updated or patched versions) will be known to support certain protocols and standards. In some embodiments, the tool can check the OS level settings to determine whether the OS allows for certain operation, such as IPv6 operation. The tool may also be able to scan various virtual machine images are being used or contact various agents running an OS in a customer allocation. A tool can also analyze various libraries for which a given OS instance is enabled, where the tool may be able to determine that the OS level settings are missing HTTP 6 support or proper configuration for DNS for IPv6 on a given host. In such situations, the OS layer tool can determine which OS instances are not compliant, or may not be compliant or compatible, and can provide at least an identification of those instances. The tool may also provide recommendations where appropriate, such as to install an available patch or update to a given instance, or to change to a resource running a different OS that is compliant. In some embodiments, a tool may be permitted to automatically apply an available update or patch to an OS to enable that instance to support the new or additional standard or protocol.

While an infrastructure layer tool 204 can determine whether resources can send IPv6 packets back and forth, for example, such a tool may not provide information as to whether those resources can understand the communication. For example, source A 214 may be able to send an IPv6 packet to destination B 216, since the network supports IPv6 communications. The tool may not, however, indicate whether source A or destination B can process these communications, by being compliant and able to understand communications using the IPv6 protocol. In order to make such determinations, code layer tool 210 can attempt to ensure that any application running on top of an IPv6-compliant OS, for example, is also IPv6 compliant. While certain applications may be verified as compliant, there may be other applications that include at least some amount of custom code, open source code, or code provided by a given user, where compliance or compatibility may be undetermined. A code layer tool 2xx can attempt to determine, at the code level, whether the code of an application (or process, etc.) supports a given protocol or standard. A tool can accept as input the code for a given application or process. The tool can attempt to map the code onto known best practices for coding, to determine whether there are any deviations from best practices and/or any places where the code can be optimized. This may include, for example, identifying any place where a protocol or standard is hard-coded into the code, which can deviate from best practices. The tool can also attempt to identify, based upon changes known for an upgrade from a current to a new protocol, for example, where changes to the code may be required, such as where the code specifies an action that is not compliant with the new protocol. In some embodiments, the tool can provide an indication of such locations in the code, and may also provide a recommended change. The tool in some embodiments may also enable the user to approve the recommended change, which can then be made by the tool if permitted. In some embodiments, a tool may be able to make at least certain types of adjustments automatically if permitted by the user, such as to update a type of call to be make or type of variable to be used. A tool may be able to scan the code for IPv4 dependencies, and then modify these to correspond to IPv6 dependencies, or general protocol dependencies where possible.

In at least one embodiment, a neural network or AI model can be used to learn variations that may be present in code. Such a network can be trained using an initial set of rules or best practices, along with training data instances of code that comply (or do not comply) with these rules and practices. This can include identifying which types of information should be hard coded and which shouldn't, as well as formats for various calls or operations, and the ways in which data for those calls or operations are handled. Definitions or types of variables used can indicate whether a new or alternative protocol would be supported, such as where a number of bits needed for a new protocol exceeds the number of bits allocated for a variable in the code. The neural network can also learn to distinguish between dependencies of IPv4 and IPv6, for example, and identify the presence of these dependencies in the code. The network can then also be used to recommend alternative code to be used to provide for IPv6 dependencies as appropriate.

Accordingly, an analyzer tool 202 can utilize sub-tools at these various layers to obtain information about the support for a new or additional protocol or standard (or other technology) in a given allocation or environment, as may relate to a private cloud or sub-network. The tool 202 can provide an end-to-end view of the allocation or environment, including identification of any potential issues with the update or addition, as well as which resources may be impacted by (or causing) those issues. In various embodiments, such information can enable a user, resource provider, or other authorized entity to make any changes needed to enable this allocation or environment to support this new standard or protocol. In at least some embodiments, this tool 202 may make recommendations as to specific changes, or may automatically make at least some of the necessary or recommended changes, at least to an extent permitted by the user or resource provider. These changes can be made before adoption of this new standard or protocol is attempted. The tool may provide an interface enabling a user to indicate whether automatic remediation may be performed, as well as specification of which types of remediation, or types of resources for which automatic remediation can be performed. In some embodiments, the tool 202 may also provide an interface through which an authorized user can make at least some of these changes, such as to accept a recommendation, or to change a coding or setting in an application, or install an update to an OS on an allocated resource, among other such options. In some instances a tool may also present multiple options or recommendations for remediation, such as to put IPv6 on an interface, add IPv6 to a routing table, or select an alternative resource or service.

In at least one embodiment, this analyzer tool 202 may itself be part of an independent service that can be run on any appropriate environment, network, or allocation where sufficient permission and access is granted. Such a service can analyze flow logs, event logs, audit logs, and other available information to make these determinations, while such a tool can also communicate with various resources if permitted.

In some embodiments, an analyzer service can also be integrated with other services in a resource provider or service provider offering or environment. An analyzer service can also use other services in its analysis, such as to use a service such as SageMaker to perform code-level analysis. Such a service can also potentially integrate with various APIs and database management services to understand a level of support for a given protocol or standard. An analyzer service can also perform ongoing monitoring, such that if a new host, resource, or application is added to an allocation or environment, the service can ensure that this addition is compliant or compatible with various protocols or standards before allowing that addition to operate within that allocation or environment. Monitoring can also include periodic checks of various resources at a frequency or interval specified by a user or provider. This monitoring can also analyze changes made in an attempt to perform remediation, such as to support a given protocol, to ensure that this remediation has been successful before adopting that protocol.

In some embodiments, an analyzer tool with monitoring capabilities can have the ability to provide alerts or notifications as appropriate. For example, the analyzer tool can detect a new service or host available in an environment, and can determine that this new host or service does not support a standard or protocol required for successful operation of this environment (at least without an unreasonable risk of errors). The tool can then generate and send an alert or notification to an appropriate party regarding the lack of support. In some cases, the tool may be able to prevent operation of that host or service in that environment until such support is provided. Where possible, the tool may be able to make adjustments to the host or service to provide such support. Such a tool has an advantage over other analytical tools in that it automatically provides an intelligent and holistic view of an entire environment or allocation, and can identify potential incompatibilities within that environment. Such a tool can identify not only resources (or applications, etc.) that do not support a given protocol or standard, but can also identify resources that may support that protocol or standard but that generate a conflict in the system, as may be due to custom code or configuration. In some embodiments, such a tool can generate a report that acts as a type of checklist for an environment, indicating all resources in (or services contacted by) an environment, for example, as well as one or more protocols or standards that are supported by those resources and, where applicable, any protocols or standards that are not supported by those resources. The tool can then provide further information for any of these determinations, including recommendations or options for remediation where applicable.

In some embodiments, such an analyzer tool may be used advantageously even when there is no intent to add or modify any protocols or standards supported in an environment. Such a tool can generate a mapping of the environment, then indicate protocols or standards supported, or not supported by any resources in (or contacted by other resources in) the environment. The tool can generate a notification of any potential incompatibility, as well as a recommendation or option for remediation. Such a tool can thus pre-emptively correct for any potential compatibility or support issues that might otherwise not even be identified before an error occurs. Such an approach also helps to ensure than any changes to the environment at a monitored level do not generate compatibility, support, or other such issues. If there are components or aspects of an environment that a tool cannot determine, access, or verify, the tool can provide such information in its report or summary, such that a user can determine whether to independently investigate these components or aspects. For example, a user may not want a third party tool to have access to their code.

As mentioned, such a tool is not limited to use with updates or changes in protocols or standards. Such a tool can be used for any current or proposed migration, update, or modification in an environment, network, or allocation. The tool can provide information about various dependencies, compatibilities, and support within that environment. Dependencies on anything in an environment can be potential sources of problems if those dependencies are no longer present or can no longer be satisfied. Such information can be provided for applications as well, which can serve as a valuable tool for application providers who may want to quickly determine that only the expected dependencies are present in their application, which may be challenging for complex applications that may have used multiple large teams of programmers or developers.

In some embodiments, a user or provider may be able to define or customize their own analysis structure. For example, a user can define which levels are to be analyzed, as well as which components at a given level. The user can provide for the permitted types of discovery, as well as which logs an analyzer can use. Such an approach can help a user to obtain as much analysis and remediation information as possible, while controlling the access that the tool has within the user environment. A report generated by the tool can also provide information about the types of information that were not analyzed or determined, such that the user or provider can determine whether and/or where independent or related analysis should be performed.

Figure 3:
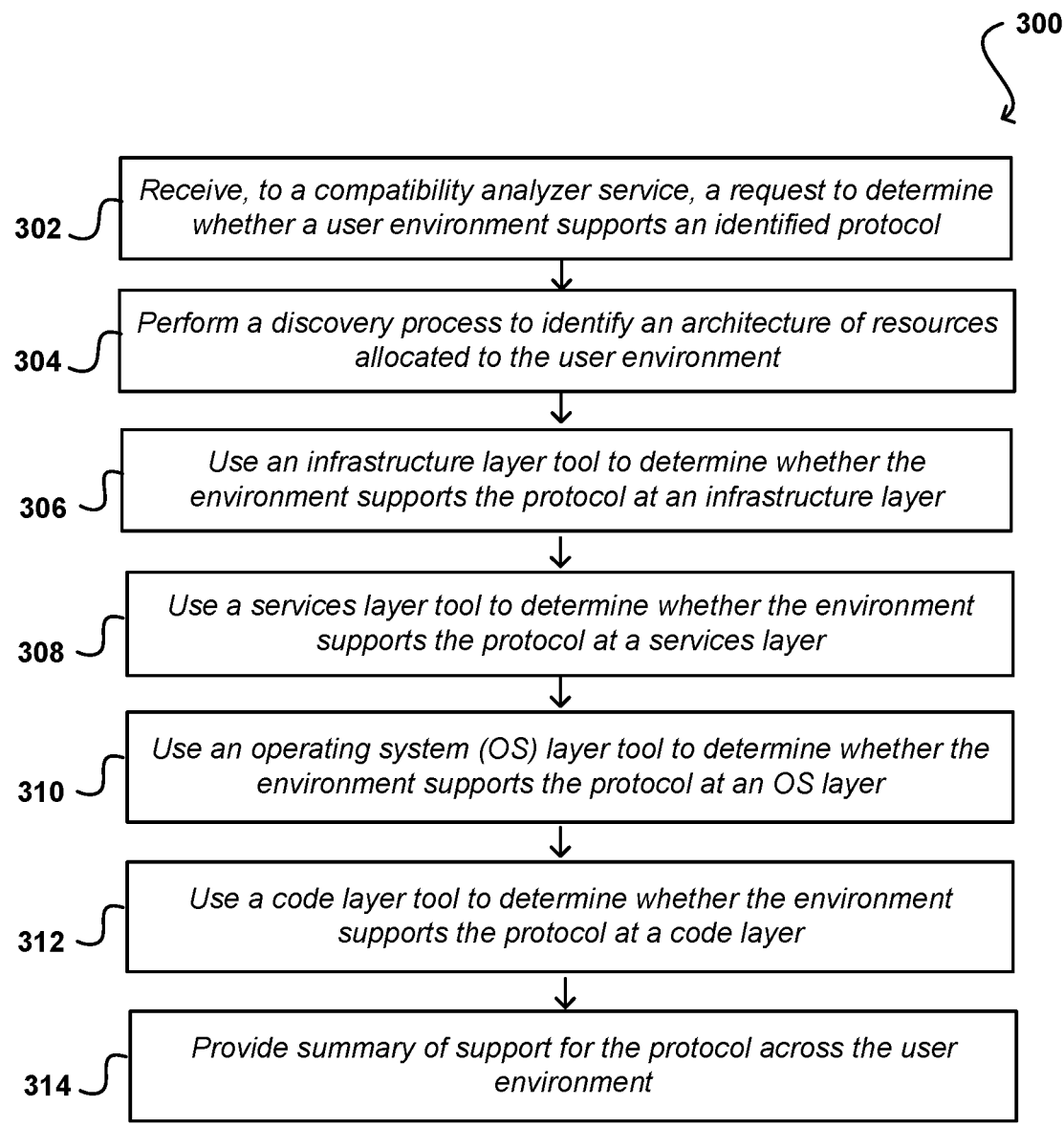
FIG. 3 illustrates an example process for determining compatibility of an environment with an identified protocol, in accordance with various embodiments.

FIG. 3 illustrates an example process 300 for analyzing an environment for compatibility (and other such) issues that can be performed in accordance with various embodiments. It should be understood that for this and other processes presented herein there may be additional, fewer, or alternative steps performed in similar or alternative orders, or at least partially in parallel, within the scope of the various embodiments unless otherwise specifically stated. Further, although this example process will be discussed with respect to compatibility issues in a user environment, it should be understood that other support, dependency, conflict, or other such issues in any other environment, system, or group of resources may be identified and/or managed as well within the scope of the various embodiments. In this example, a request to determine whether a user environment supports an identified protocol can be received 302. This request can be received from any authorized party, device, entity, or process, as may be associated with the user. Information for the request can be directed to a compatibility analyzer service, for example, which can attempt to determine the corresponding compatibility data for one or more layers (or levels, etc.) of the user environment. If not already performed, or if any updates are to be identified, a discovery process can be performed 304 to identify an architecture of resources allocated to the user environment. In some embodiments, a discover process might always be performed for such an analysis in order to ensure that the architecture information is accurate and up-to-date.

Once an understanding of the architecture is obtained, as well as the types of resources used to provide that architecture, an analyzer service can attempt to determine compatibility for the protocol at multiple layers, which in this example is illustrated to be performed in sequence but it should be understood that these various tools can operate in parallel as well in other embodiments. In this example, the analyzer service can use 306 an infrastructure layer tool to determine whether the environment supports the identified protocol at the infrastructure level. This can include, for example, determining whether communications that comply with the protocol would be able to be transmitted between any relevant resources in this environment. The analyzer service can also use 308 a services layer tool to determine whether the environment supports the identified protocol at the services level. This can include, for example, determining whether any service called, or likely to be called, by one or more resources in the environment comply with the protocol. This may include, for example, identifying these services through analysis of flow log data and then determining compatibility for each of these services. The analyzer service can also use 310 an operating system (OS) layer tool to determine whether the environment supports the identified protocol at the OS level. This can include, for example, determining the OS (including any relevant version and configuration information) running, or set to run, on any of the resources in this environment, and determining compatibility for each identified OS. The analyzer service can also use 312 a code layer tool to determine whether the environment supports the identified protocol at the code level. This can include, for example, determining whether any application, process, or operation provided to be executed in the environment is compatible with the protocol, as may involve analyzing the code itself, at least to an extent accessible and permissible. A summary of support for the protocol across the user environment can be provided 314 to a user, resource provider, or other such entity, as may include identification of any incompatibilities or related issues, as well as recommendations for remediations or other such information.

Figure 4:
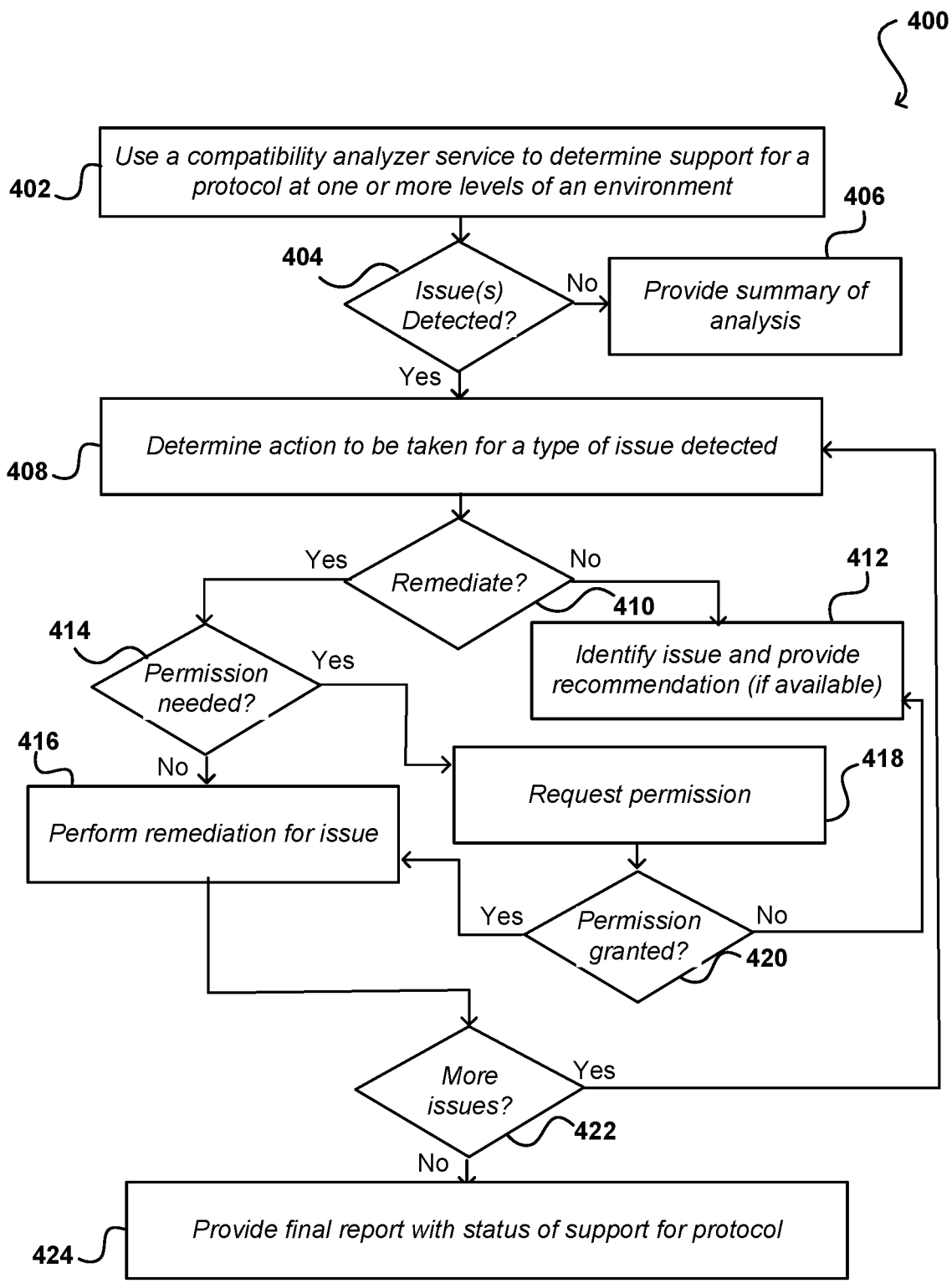
FIG. 4 illustrates an example process for managing identified compatibility issues in an environment, in accordance with various embodiments.

FIG. 4 illustrates an example process 400 for managing identified compatibility issues in an environment that can be performed in accordance with various embodiments. In this example, a compatibility analyzer service (or other such system, service, or process as discussed herein) can be used 402 to determine support for a protocol (or standard, language, format, etc.) at one or more levels (or layers) of an environment. This can include using a set of tools or sub-services to analyze the environment for compatibility at multiple different levels. A determination can be made 404 as to whether any compatibility (or related) issues are detected in the environment. If not, a summary of the analysis can be provided 406 indicating that the environment is determined to be compatible with the protocol without any identified issues. If one or more issues (or potential issues) are identified, however, an action can be determined 408 to be taken for each of these identified issues, or at least for each type of identified issue. In this example, it can be determined 410 for a given issue, or type of issue, whether a remediation is to be performed if available. If remediation is not to be performed, at least for this type of issue, then the issue can be identified 412 to a recipient or provided in a report, for example, along with any recommendation for remediating the issue, if available. If this is a potentially critical issue, then this indication may also (or alternatively) take the form of an alert that can be sent to one or more recipients responsible for an integrity or operation of the environment, or at least one potentially impacted aspect of the environment.

If remediation is to be attempted (or at least investigated) for this type of issue, then a determination can be made 414 as to whether permission is needed before a certain action can be taken. For example, there may be certain actions that are allowed to be performed automatically, which may be considered relatively low risk, and there may be actions that at least require human review and permission before such an action can be performed, as may be configurable by a user or resource provider, etc. If it is determined 414 that permission is needed then permission can be requested 418 for the action, which may involve identifying the type of action proposed to be taken (or multiple options that could be taken) and information for the impacted resource(s), among other such options. If it is determined 420 that such permission is not granted, then information for the issue and any recommendation(s) for remediation can be provided as discussed above. If permission is granted, or if permission for this type of action is not needed, then the analyzer service (or a system, service, or process in communication with the analyzer service) can perform 416 remediation for this issue, or type of issue. If there are multiple issues of this type, then remediation may be performed for all of these if permitted. If remediation is not successful then the remediation may be rolled back and information provided to an appropriate recipient, such as the user or resource provider. If it is determined 422 that there are more issues to be addressed then this process can continue for a next issue, or type of issue. If all issues have been addressed, at least for this round of analysis, then a final report (or other log or summary) can be provided 424 with the status of support for the protocol, as may include issues that were identified, issues where remediation was performed, the types of remediation performed, and any outstanding compatibility or other issues, as well as recommendations for remediation if available. In some embodiments, this information can be provided as input to an analyzer neural network or artificial intelligence model, for example, for continued learning as discussed herein.

Figure 5:
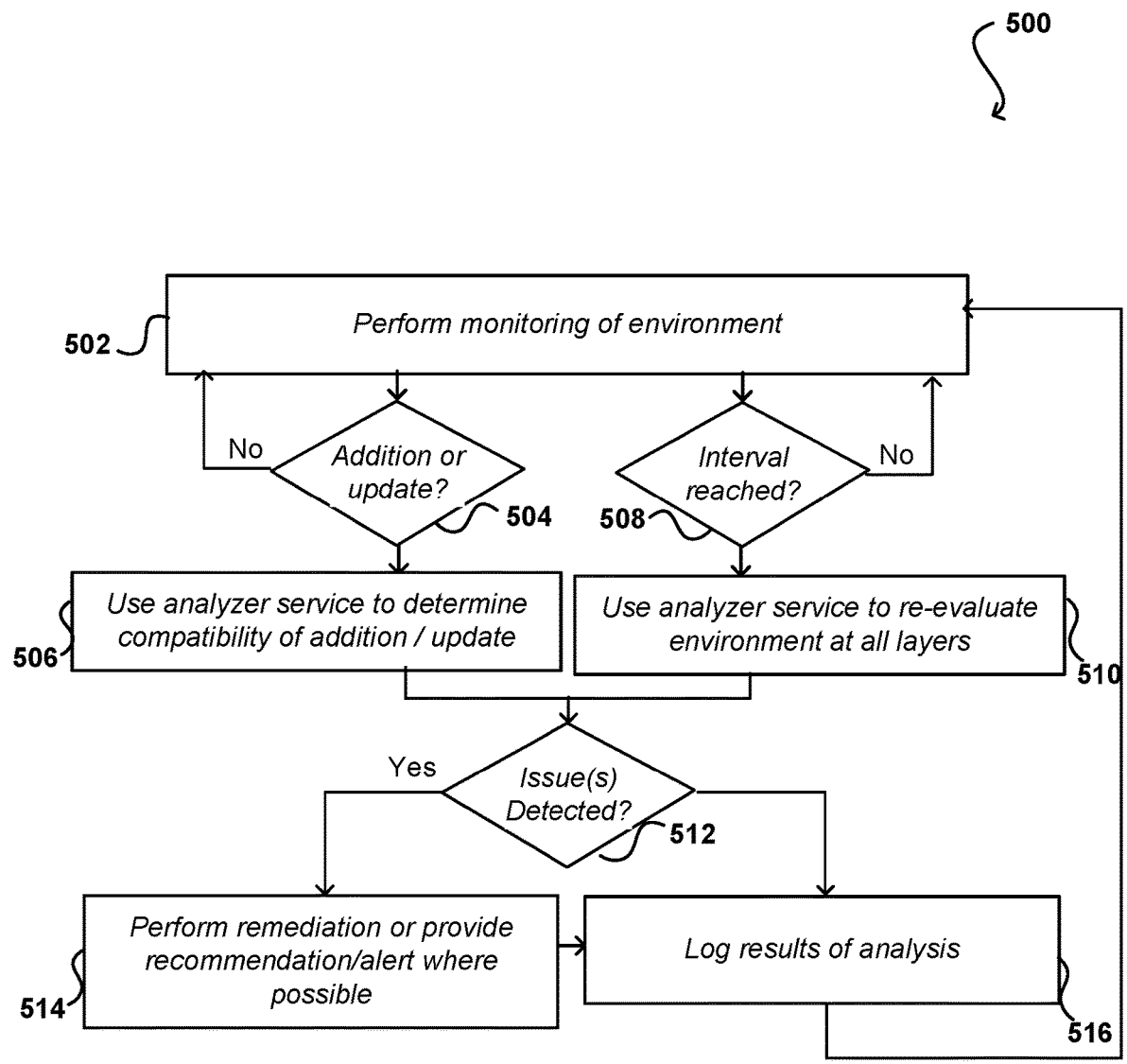
FIG. 5 illustrates an example process for performing compatibility monitoring for an environment, in accordance with various embodiments.

FIG. 5 illustrates an example process 500 for monitoring an environment for compatibility and other such issues that can be performed in accordance with various embodiments. In this example, monitoring of a given environment can be performed 502, where that environment can be any environment, allocation, or grouping of networked resources for which compatibility issues are to be identified. During this monitoring, a determination can be made 504 as to whether any addition or update has occurred in this environment for which compatibility may be impacted, such as where a new host has been allocated or a software version has been updated. If so, an analyzer service can be used 506 to determine any potential or actual compatibility issues resulting from the addition or update, such as where a new host does not support a required communication protocol for the environment. In at least some instances, such a compatibility check can be performed when a request to add or modify a resource is received but before that addition or modification is performed. This can help to ensure that an incompatibility is not introduced into the environment. As mentioned elsewhere herein, an incompatibility is not limited to an incompatibility in communication protocol, but can relate to any detected incompatibility or other such operational issue at any layer or level of an environment for which there is a tool or process to analyze compatibility. The compatibility may not be specific to technology or protocols as well, but may relate to limits, quotas, or capacity issues as well, such as whether a user is allowed to spin up another VPC in an environment under a given account or whether a change or addition would cause a performance criterion to fall outside an acceptable range, among other such options.

Similarly, the monitoring may have a frequency or interval indicated at which compatibility checks should be performed of the entire environment, to ensure continued compatibility over time. If such an interval or point it time is determined 508 to have been reached then the analyzer service can be used to re-evaluate the environment at all layers, or at least a subset of layers. In some embodiments, there may be different intervals or frequencies of evaluation, as it may be more important to frequently evaluate the code or communication infrastructure, which may change relatively frequently, than to frequently evaluate the operating systems or services used, which may not change with relative frequency. For either type of analysis, a determination can be made 512 as to whether there were any compatibility (or related) issues identified, and if so then a remediation can be performed 514 if available and permitted, or at least a notification or alert provided for the issue, along with a recommendation for remediation if available. Any results of this analysis can then be logged 516 or otherwise stored for subsequent evaluation, auditing, training, or other such purposes.

Figure 6:
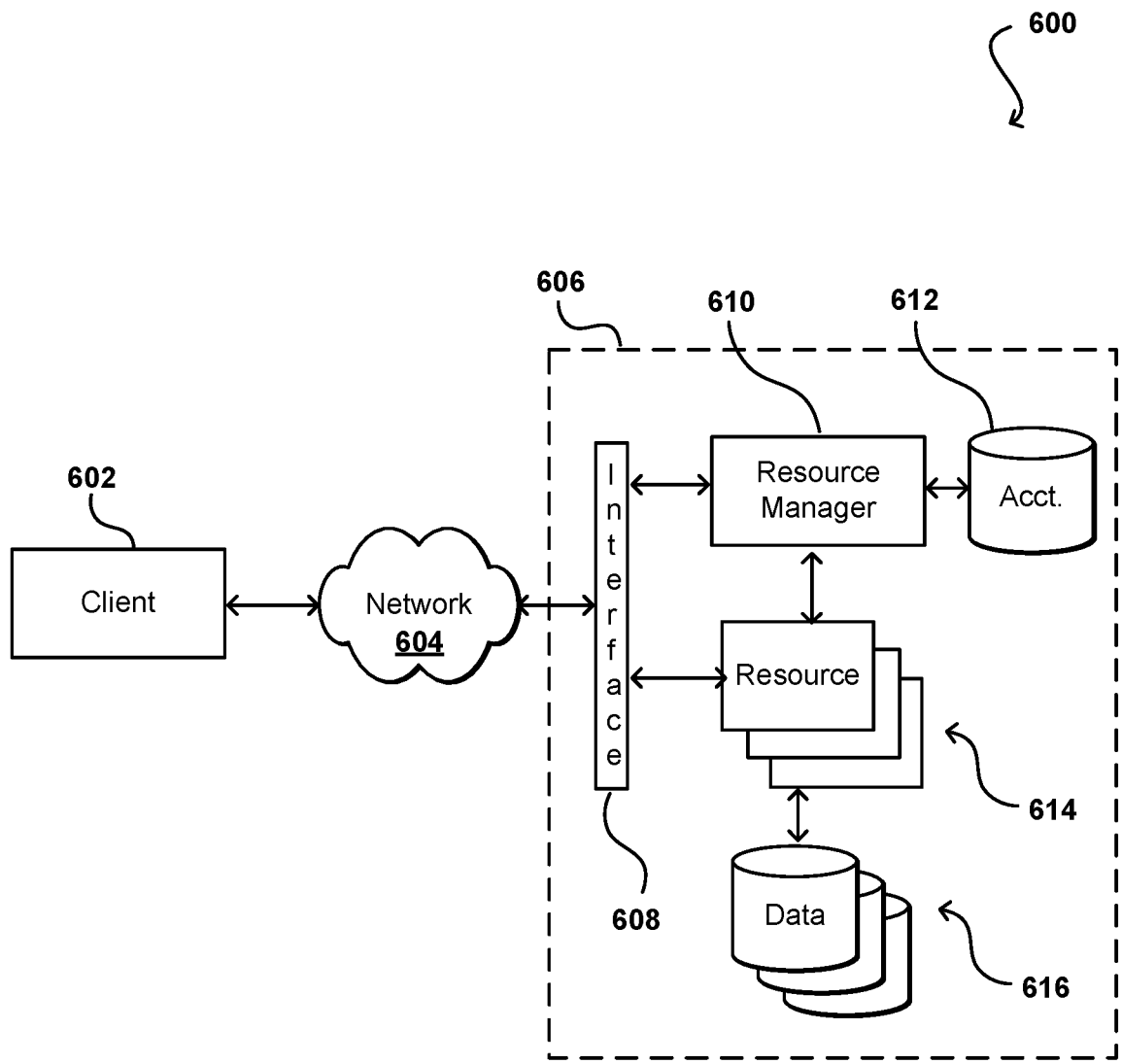
FIG. 6 illustrates an example network-inclusive computing environment in which aspects of various embodiments can be implemented.

FIG. 6 illustrates an example environment 600 in which aspect of various embodiments can be implemented. Such an environment can be used in some embodiments to provide resource capacity for one or more users, or customers of a resource provider, as part of a shared or multi-tenant resource environment. In this example a user is able to utilize a client device 602 to submit requests across at least one network 604 to a multi-tenant resource provider environment 606. This can include an end client that is able to use a certificate for secure communications, where the certificate was obtained using a requestor executing on the end client. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 604 can include any appropriate network, including an intranet, the Internet, a cellular network, a local area network (LAN), or any other such network or combination, and communication over the network can be enabled via wired and/or wireless connections. The resource provider environment 606 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 606 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 614 of one or more types. These types can include, for example, application servers operable to process instructions provided by a user or database servers operable to process data stored in one or more data stores 616 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 614 can submit a request that is received to an interface layer 608 of the provider environment 606. The interface layer can include application programming interfaces (APIs) or other exposed interfaces enabling a user to submit requests to the provider environment. The interface layer 608 in this example can also include other components as well, such as at least one Web server, routing components, load balancers, and the like. When a request to provision a resource is received to the interface layer 608, information for the request can be directed to a resource manager 610 or other such system, service, or component configured to manage user accounts and information, resource provisioning and usage, and other such aspects. A resource manager 610 receiving the request can perform tasks such as to authenticate an identity of the user submitting the request, as well as to determine whether that user has an existing account with the resource provider, where the account data may be stored in at least one data store 612 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identity, specific address, or other such information that can enable the client device 602 to communicate with an allocated resource without having to communicate with the resource manager 610, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 610 (or another such system or service) in this example can also function as a virtual layer of hardware and software components that handles control functions in addition to management actions, as may include provisioning, scaling, replication, etc. The resource manager can utilize dedicated APIs in the interface layer 608, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 608 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 7:
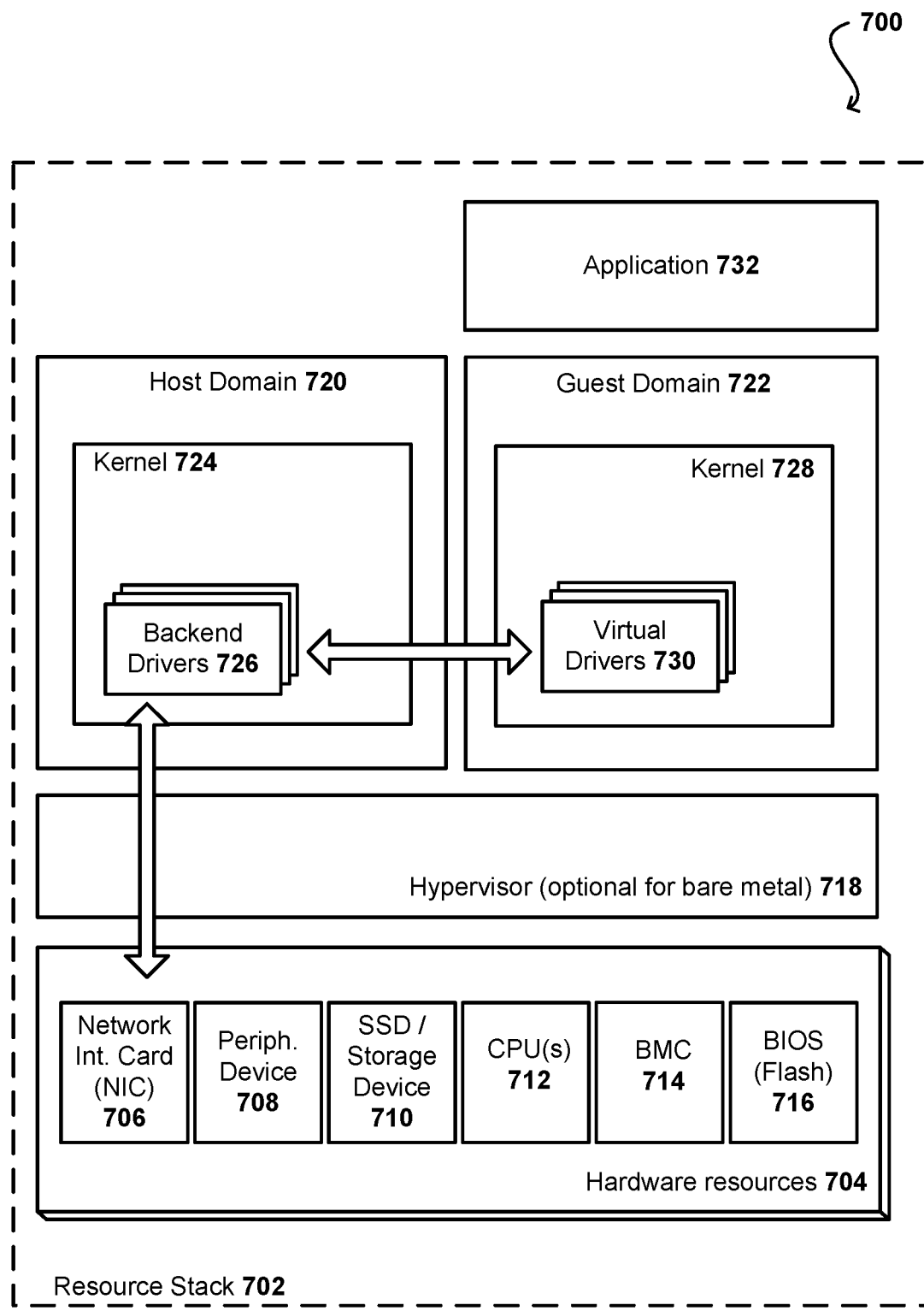
FIG. 7 illustrates example components of a server that can be utilized to perform at least a portion of a transcoding process, in accordance with various embodiments.

FIG. 7 illustrates an example resource stack 702 of a physical resource 700 that can be utilized in accordance with various embodiments. Such a resource stack 702 can be used to provide an allocated environment for a user (or customer of a resource provider) having an operating system provisioned on the resource. In accordance with the illustrated embodiment, the resource stack 702 includes a number of hardware resources 704, such as one or more central processing units (CPUs) 712; solid state drives (SSDs) or other storage devices 710; a network interface card (NIC) 706, one or more peripheral devices (e.g., a graphics processing unit (GPU), etc.) 708, a BIOS implemented in flash memory 716, and a baseboard management controller (BMC) 714, and the like. In some embodiments, the hardware resources 704 reside on a single computing device (e.g. chassis). In other embodiments, the hardware resources can reside on multiple devices, racks, chassis, and the like. Running on top of the hardware resources 704, a virtual resource stack may include a virtualization layer such as a hypervisor 718 for a Xen-based implementation, a host domain 720, and potentially also one or more guest domains 722 capable of executing at least one application 732. The hypervisor 718, if utilized for a virtualized environment, can manage execution of the one or more guest operating systems and allow multiple instances of different operating systems to share the underlying hardware resources 704. Conventionally, hypervisors are installed on server hardware, with the function of running guest operating systems, where the guest operating systems themselves act as servers.

In accordance with an embodiment, a hypervisor 718 can host a number of domains (e.g., virtual machines), such as the host domain 720 and one or more guest domains 722. In one embodiment, the host domain 720 (e.g., the Dom-0) is the first domain created and helps virtualize hardware resources and manage all of the other domains running on the hypervisor 718. For example, the host domain 720 can manage the creating, destroying, migrating, saving, or restoring the one or more guest domains 722 (e.g., the Dom-U). In accordance with various embodiments, the hypervisor 718 can control access to the hardware resources such as the CPU, input/output (I/O) memory, and hypervisor memory.

A guest domain 722 can include one or more virtualized or para-virtualized drivers 730 and the host domain can include one or more backend device drivers 726. When the operating system (OS) kernel 728 in the guest domain 722 wants to invoke an I/O operation, the virtualized driver 730 may perform the operation by way of communicating with the backend device driver 726 in the host domain 720. When the guest driver 730 wants to initiate an I/O operation (e.g., to send out a network packet), a guest kernel component can identify which physical memory buffer contains the packet (or other data) and the guest driver 730 can either copy the memory buffer to a temporary storage location in the kernel for performing I/O or obtain a set of pointers to the memory pages that contain the packet(s). In at least one embodiment, these locations or pointers are provided to the backend driver 726 of the host kernel 724 which can obtain access to the data and communicate it directly to the hardware device, such as the NIC 706 for sending the packet over the network.

It should be noted that the resource stack 702 illustrated in FIG. 7 is only one possible example of a set of resources that is capable of providing a virtualized computing environment and that the various embodiments described herein are not necessarily limited to this particular resource stack. In some embodiments, the guest domain 722 may have substantially native or "bare metal" access to the NIC 706 hardware, for example as provided by device assignment technology based on an IO Memory Management Unit (IO-MMU) device mapping solution like Intel VT-D. In such an implementation, there may be no virtualization layer (e.g., Hypervisor) present. The host domain, or OS, may then be provided by the user, with no guest domains utilized. Other technologies, such Single Root IO Virtualization (SR-IOV), may provide similar "bare metal" functionality to guest domains for only certain functionality of the devices. In general, in various other embodiments, the resource stack may comprise different virtualization strategies, hardware devices, operating systems, kernels, domains, drivers, hypervisors and other resources.

In compute servers, a Board Management Controller (BMC) 714 can maintain a list of events that have occurred in the system, referred to herein as a system event log (SEL). In at least one embodiment, the BMC 714 can receive system event logs from the BIOS 716 on the host processor. The BIOS 716 can provide data for system events over an appropriate interface, such as an I²C interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

As mentioned, in a virtualized environment the hypervisor 718 can prevent the guest operating system, or guest domain 722, from sending such system event log data to the BMC 714. In the case of bare metal access without such a hypervisor, however, user instances can have the ability to send data for system event that spoof events from the BIOS 716. Such activity could lead to compromised bare metal instances being prematurely degraded due to fake system event data produced by the user OS.

In at least one embodiment, however, there will be portions of the physical resource 700 that will be inaccessible to the user OS. This can include, for example, at least a portion of BIOS memory 716. BIOS memory 716 in at least one embodiment is volatile memory such that any data stored to that memory will be lost in the event of a reboot or power down event. The BIOS may keep at least a portion of host memory unmapped, such that it is not discoverable by a host OS. As mentioned, data such as a secret token can be stored to BIOS memory 716 at boot time, before a user OS is executing on the resource. Once the user OS is executing on the resource, that OS will be prevented from accessing that secret token in BIOS memory 716. In at least one embodiment, this secret token (or other stored secret) can be provided to the BMC 714 when adding system event log events, whereby the BMC 714 can confirm that the event is being sent by the BIOS 716 and not by the user OS.

Figure 8:
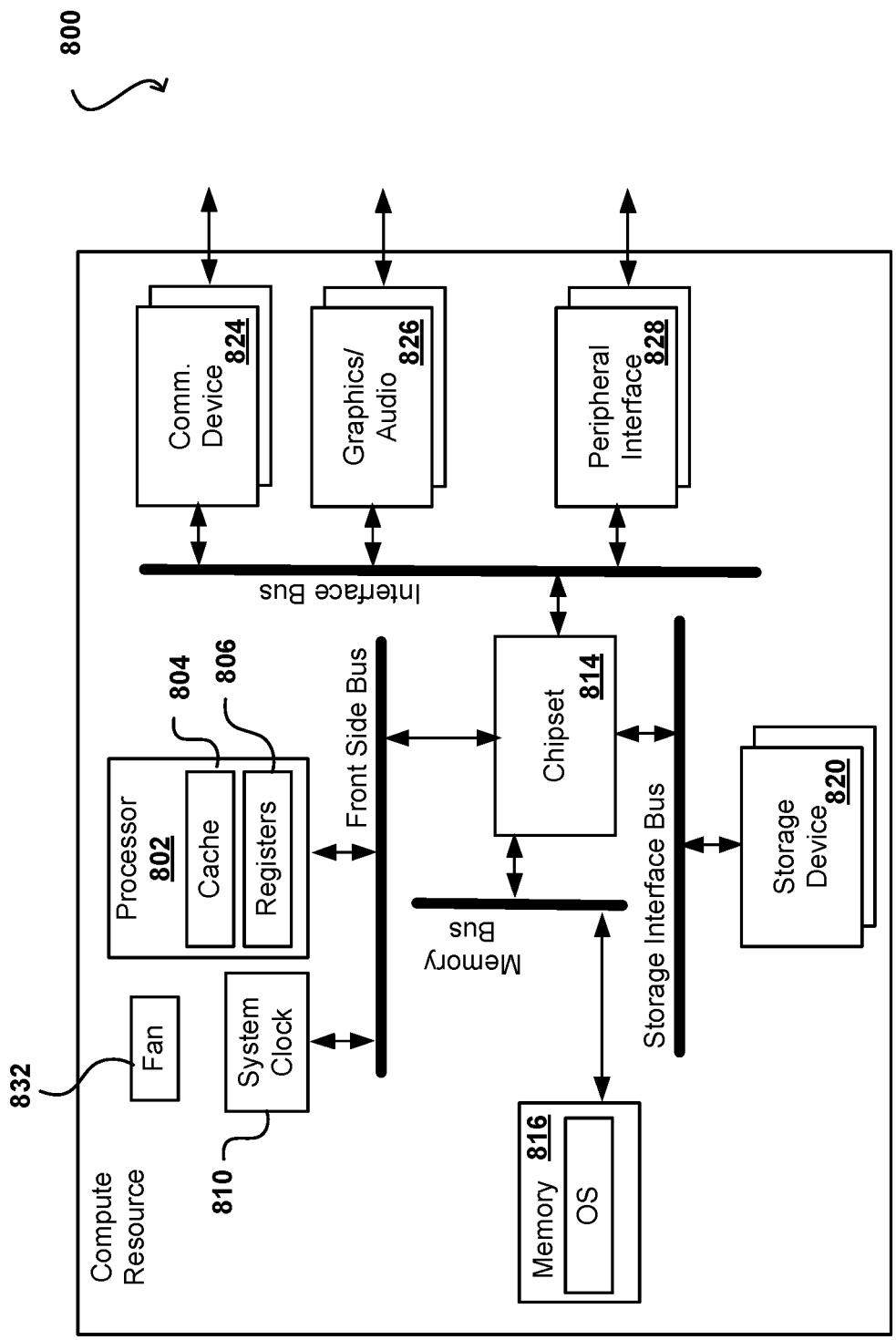
FIG. 8 illustrates example components of a computing device that can be used to implement aspects of various embodiments.

Computing resources, such as servers or personal computers, will generally include at least a set of standard components configured for general purpose operation, although various proprietary components and configurations can be used as well within the scope of the various embodiments. FIG. 8 illustrates components of an example computing resource 800 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 800 (e.g., a desktop or network server) will have one or more processors 802, such as central processing units (CPUs), graphics processing units (GPUs), and the like, that are electronically and/or communicatively coupled with various components using various buses, traces, and other such mechanisms. A processor 802 can include memory registers 806 and cache memory 804 for holding instructions, data, and the like. In this example, a chipset 814, which can include a northbridge and southbridge in some embodiments, can work with the various system buses to connect the processor 802 to components such as system memory 816, in the form or physical RAM or ROM, which can include the code for the operating system as well as various other instructions and data utilized for operation of the computing device. The computing device can also contain, or communicate with, one or more storage devices 820, such as hard drives, flash drives, optical storage, and the like, for persisting data and instructions similar, or in addition to, those stored in the processor and memory. The processor 802 can also communicate with various other components via the chipset 814 and an interface bus (or graphics bus, etc.), where those components can include communications devices 824 such as cellular modems or network cards, media components 826, such as graphics cards and audio components, and peripheral interfaces 828 for connecting peripheral devices, such as printers, keyboards, and the like. At least one cooling fan 832 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 802 can obtain data from physical memory 816, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 804 in at least some embodiments. The computing device 800 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 828, a communication device 824, a graphics or audio card 826, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 802 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical. Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Prehoot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may, selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle °, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    performing a discovery process to identify a set of networked resources in a target environment;

using an infrastructure layer tool to determine whether there are any compatibility issues at an infrastructure layer of the target environment;

using a services layer tool to determine whether there are any compatibility issues at a services layer of the target environment;

using an operating system (OS) layer tool to determine whether there are any compatibility issues at an OS layer of the target environment;

using a code layer tool to determine whether there are any compatibility issues at a code layer of the target environment; and providing information regarding the compatibility issues determined for the target environment, the information including one or more recommendations for remediating the compatibility issues.

2. The computer-implemented method of claim 1, wherein the compatibility issues relate to a proposed change in a protocol to be used to communicate between the set of networked resources in the target environment.

3. The computer-implemented method of claim 2, wherein the proposed change in the protocol is to move from Internet Protocol version 4 (IPv4) to Internet Protocol version 6 (IPv6).

4. The computer-implemented method of claim 1, further comprising:

automatically performing one or more permissible remediations for one or more of the compatibility issues determined in the target environment.

5. The computer-implemented method of claim 1, wherein the infrastructure layer tool, services layer tool, OS layer tool, and code layer tool are provided by a compatibility analysis service callable through an application programming interface (API).

6. A method, comprising:

receiving a request to analyze a compatibility of a set of resources in a networked environment;

identifying a configuration of the set of resources in the networked environment;

identifying, using a plurality of tools analyzing the networked environment at a respective plurality of layers, one or more issues impacting the compatibility of the set of resources;

determining, for the one or more issues, one or more recommendations for remediating the one or more issues; and providing a set of results identifying the one or more issues and providing the one or more recommendations.

7. The method of claim 6, wherein the plurality of tools includes an infrastructure layer tool to analyze the networked environment at an infrastructure layer, the infrastructure layer tool further to perform a discovery process to determine the configuration of the set of resources.

8. The method of claim 6, wherein the plurality of tools includes a services layer tool to analyze the networked environment at a services layer, the services layer tool further to analyze one or more flow logs to determine a set of services called by the set of resources.

9. The method of claim 6, wherein the plurality of tools includes an operating system (OS) layer tool to analyze the networked environment at an OS layer, the OS layer tool further to determine the version of the OS running, or planned to run, on individual resources of the set of resources.

10. The method of claim 6, wherein the plurality of tools includes a code layer tool to analyze the networked environment at a code layer, the code layer tool further to compare the code against a set of best practices for coding to identify the one or more issues.

11. The method of claim 6, wherein plurality of tools are provided by a compatibility analyzer service callable through an application programming interface (API).

12. The method of claim 11, further comprising:

receiving, to the API of the compatibility analyzer service, a request to determine combability with respect to a proposed change in a communication protocol used in the networked environment, wherein the one or more issues impacting the compatibility relate to the proposed change.

13. The method of claim 11, further comprising:

performing one or more automated remediations to address the one or more issues before implementing the proposed change in the communication protocol.

14. The method of claim 6, wherein the request is received in response to a change in the networked environment or as part of a compatibility monitoring process.

15. A system, comprising:

a processor; and memory including instructions that, when executed by the processor, cause the system to:

identify a configuration of a set of resources in a networked environment;

identify, using a plurality of tools analyzing the networked environment at a respective plurality of layers, one or more issues impacting a compatibility of the set of resources;

determine, for the one or more issues, one or more recommendations for remediating the one or more issues; and provide a single report identifying the one or more issues and providing the one or more recommendations.

16. The system of claim 15, wherein the plurality of tools includes an infrastructure layer tool to analyze the networked environment at an infrastructure layer, the infrastructure layer tool further to perform a discovery process to determine the configuration of the set of resources.

17. The system of claim 15, wherein the plurality of tools includes a services layer tool to analyze the networked environment at a services layer, the services layer tool further to analyze one or more flow logs to determine a set of services called by the set of resources.

18. The system of claim 15, wherein the plurality of tools includes an operating system (OS) layer tool to analyze the networked environment at an OS layer, the OS layer tool further to determine the version of the OS running, or planned to run, on individual resources of the set of resources.

19. The system of claim 15, wherein the plurality of tools includes a code layer tool to analyze the networked environment at a code layer, the code layer tool further to compare the code against a set of best practices for coding to identify the one or more issues.

20. The system of claim 15, wherein plurality of tools are provided by a compatibility analyzer service callable through an application programming interface (API).

* * * * *

UNITED STATES PATENT AND TRADEMARK OFFICE
CERTIFICATE OF CORRECTION

| | | |
|---|---|---|
| PATENT NO. | : 11,843,507 B1 | |
| APPLICATION NO. | : 18/064464 | |
| DATED | : December 12, 2023 | |
| INVENTOR(S) | : Rodica-Alexandra Huides | |

It is certified that error appears in the above-identified patent and that said Letters Patent is hereby corrected as shown below:

On the Title Page

Item (72), Inventor, update name as follows:
Rodica-Alexandra Huides

Signed and Sealed this
Twenty-first Day of May, 2024

*Katherine Kelly Vidal*

Katherine Kelly Vidal
*Director of the United States Patent and Trademark Office*